United States Patent
Rolf

(10) Patent No.: US 6,506,308 B1
(45) Date of Patent: Jan. 14, 2003

(54) METHODS FOR THE REMOVAL OF ORGANIC SUBSTANCES FROM AQUEOUS SOLUTIONS

(75) Inventor: John Mark Rolf, Los Angeles, CA (US)

(73) Assignee: Advanced Minerals Corporation, Santa Barbara, CA (US)

( * ) Notice: Subject to any disclaimer, the term of this patent is extended or adjusted under 35 U.S.C. 154(b) by 288 days.

(21) Appl. No.: 09/659,939

(22) Filed: Sep. 12, 2000

(51) Int. Cl.$^7$ .................................................. C02F 1/28
(52) U.S. Cl. ...................... 210/691; 210/764; 210/787; 210/800; 210/908
(58) Field of Search ................................ 210/691, 764, 210/767, 787, 800, 908

(56) References Cited

U.S. PATENT DOCUMENTS

| | | |
|---|---|---|
| 4,216,086 A | 8/1980 | Lang |
| 5,656,568 A | 8/1997 | Shiuh et al. |
| 5,776,353 A | 7/1998 | Palm et al. |
| 5,908,561 A | 6/1999 | Palm et al. |
| 6,140,040 A | 10/2000 | Palm et al. |
| 6,193,891 B1 * | 2/2001 | Kent et al. |

FOREIGN PATENT DOCUMENTS

| | | |
|---|---|---|
| EP | 0 403 244 A1 | 12/1990 |
| EP | 0 403 244 B1 | 12/1990 |
| GB | 1 352 108 | 5/1974 |
| WO | WO 94/11309 | 5/1994 |
| WO | WO 98/01464 | 1/1998 |

OTHER PUBLICATIONS

Adner, Niklas and Sofer, Gail (1994). "Biotechnology Product Validation, Part 3: Chromatography Cleaning Validation," *BioPharm* 7:44–48.
Belter, Paul A., et al. (1988). *Bioseparations: Downstream Processing for Biotechnology* John Wiley & Sons, New York pp. ix–xiii (Tabel of Contents).
Bone, Roger C. (1991). "The Pathogenesis of Sepsis," *Ann Intern Med* 115(6):457–469.
Cooper, James F. et al. (1997). "The Impact of Non–endotoxin LAL–Reactive Materials on Limulus Amebocyte Lysate Analyses," *DA J Pharmaceut Sci Technol* 51(1):2–6.
Cooper, James F. and Polk, C. Scott (1998). "Monitoring Water Systems for Endotoxin," *CRL–LAL Times* 5(2):1–6.
Harris, James Robinson, Editor (1991). *Blood Separation and Plasma Fractionation* Wiley–Liss, New York, pp. v–vi (Table of Contents).

Kenney, Andrew and Fowell, Susan, Editors (1992). "Practical Protein Chromatography," vol. 11 in *Methods in Molecular Biology*, Humana Press, Totowa, New Jersey, pp. v–ix (Table of Contents).
Lydersen, Bjorn K. et al. Editors (1994). *Bioprocess Engineering: Systems, Equipment and* Facilities John Wiley & Sons, New York pp. xi–xii (Table of Contents).
Morrison, D.C. et al. (1994). "Current Status of Bacterial Endotoxins," *ASM News* 60(9):479–484.
Schaule, Gabriela and Flemming, Hans–Curt (1997). "Microbials. Pathogenic Microorganisms in Water System Biofilms," *Ultrapure Water* 14:21–22, 24–26.
Seely, Robert J. et al. (1994). "Biotechnology Product Validation, Part 7: Validation of Chromatography Resin Useful Life," *BioPharm* 7(7):41–48.
Sharma, Satish K. (1986). "Review: Endotoxin Detection and Elimination in Biotechnology," *Biotechnol Appl Biochem* 8:5–22.
Sweadner, Kathleen J. et al. (1977). "Filtration Removal of Endotoxin (Pyrogens) in Solution in Different States of Aggregation," *Appl Environ Microbiol* 34(4):382–385.
"The United States Pharmacopeia 24 & The National Formulary 19," (Official from Jan. 1, 2000). *United States Pharmacopeial Convention, Inc. Meeting at Washington, D.C.,* Mar. 9–12, 1995 pp. 1752–1754, 2154–2165.
Walker, John M., Editor (1984). "Proteins," vol. 1 in *Methods in Molecular Biology* Humana Press, Clifton, New Jersey pp. v–xi. (Table of Contents).
Wheat, R.W. (1984). "Composition, Structure, and Biosynthesis of the Bacterial Cell Envelope and Energy Storage Polymers," Chapter 6 in *Zinsser Microbiology: Eighteenth Edition,* Joklik, Wolfgang K., et al., Editors, Appleton–Century–Crofts, Norwalk, Connecticut, pp. 93–112.

* cited by examiner

*Primary Examiner*—Betsey Morrison Hoey
(74) *Attorney, Agent, or Firm*—Morrison & Foerster LLP

(57) ABSTRACT

Provided are methods for substantially removing organic substances from an aqueous solution, wherein the aqueous solution is contacted with a synthetic hydrated calcium silicate. Components that can be removed from aqueous solution include bacterial, plant, algal and fungal components. Exemplary components include endotoxins. The aqueous solution comprises, for example, water, a chemically buffered solution, a pharmaceutical solution, a solution comprising a nutritional supplement, a culture medium, or a growth medium. Other examples include pharmaceutical compendial water and non-compendial water. In one embodiment of the method, the pH of the aqueous solution is maintained at a selected pH to promote the separation, for example, about pH 5.5 to 9.5, or, e.g., about pH 5.5 to 7.5.

23 Claims, 2 Drawing Sheets

METHODS FOR THE REMOVAL OF ORGANIC SUBSTANCES FROM AQUEOUS SOLUTIONS

TECHNICAL FIELD

The present invention relates to a method for the substantial removal of bacterial, plant, algal, or fungal components, such as endotoxin, from aqueous solutions by contact of the aqueous solution with a synthetic hydrated calcium silicate.

BACKGROUND ART

Throughout this application, various publications, patents and published patent applications are referred to by an identifying citation. Corresponding complete citations are provided below under the heading "References". The disclosures of the publications, patents and publications referenced in this application are hereby incorporated by reference herein in their entirety.

Endotoxin is a lipopolysaccharide (LPS)-protein complex that is a component of the outer membrane of Gram negative bacteria. The LPS portion of the complex can be further broken down into three distinct covalently linked domains: the O antigen polysaccharide side chain, the core oligosaccharides, and the lipid A. The lipid A portion of endotoxin is critical for most biological activity and is responsible for toxicity.

During the course of bacterial infection (i.e., sepsis), LPS is released from the surface of bacteria cells, interacts with a variety of host circulating blood plasma proteins (LPS-binding proteins), and then binds to specific LPS receptors on a variety of host cells (circulating blood cells or organ-specific endothelial cells). LPS induces the host cell production and release of a variety of potent, immunologically active cytokines and other mediators of the inflammatory response. Interleukin 1 (IL-1) and tumor necrosis factor (TNF) are two of the key cytokines generated by LPS-stimulated host cells. IL-1 and TNF promote the local and systemic inflammatory processes of a wide variety of cell types, which in turn produce the clinical features of sepsis that can include fever, hypotension, vasodilatation, and tissue necrosis/organ failure (septic shock). See Morrison et al., 1994 and Bone, 1991.

Endotoxin contamination is a major concern in the manufacturing of human and animal pharmaceutical preparations, medical device components, and pharmaceutical- and medical device-related processing aids (i.e. chromatography and filtration media storage solutions). Contaminated water is the principal source of endotoxin in these products.

Typical high purity water for injection (WFI) systems in place for the manufacture of a medically-related material include a number of system components, including distillation, reverse osmosis, filtration, and ozonation units. Downstream system components include storage tanks, circulating loops for final use, and point-of-use plumbing drops to individual manufacturing suites. System components, in particular downstream components, are subject to fouling and bacterial colonization. The colonization with waterborne Gram negative bacterial species such as the pseudomonads can become a constant source of bioburden and endotoxin. Live microorganisms or their breakdown products (e.g. endotoxin) can accumulate within pipes and at their inner surfaces, particularly near threaded connections, joints, elbows or dead legs. See Schaule et al., 1997 and Cooper et al., 1998.

Rigorous monitoring of a water system is required to ensure that endotoxin is not introduced into the aqueous solutions that are prepared for use in the manufacture of a pharmaceutical or medical device product. However, even with vigilant monitoring, aqueous solutions prepared from water with endotoxin levels that are below conventional detection limits can become problematic, as the processing solutions made from the water may be employed for production unit operations where large volumes are used in repeated-cycle concentration steps (e.g. chromatography, ultrafiltration) and where Gram negative bacteria or endotoxin may be retained.

Other sources of endotoxin introduced into the aqueous solutions used for the production of pharmaceutical or medical device products can be derived from bacterial or endotoxin contamination of the chemical or other commodity ingredients used to formulate a process solution.

Removal of endotoxin from aqueous based solutions can be difficult and time-consuming. Heat inactivation or ultrafiltration are highly effective, but cannot be used when the solution contains ingredients that are heat labile, such as enzymes, and carbohydrates, or macromolecular, such as large or polymeric proteins, respectively. See Sharma, 1986 and Sweadner et al., 1977. General ion exchange chromatography methods have been developed for removal of residual endotoxin contamination from aqueous-based solutions; however, their binding capacities are often low. See Sharma, 1986. Specific endotoxin affinity resin products have been developed (Acticlean Etox®, Sterogene, Carlsbad, Calif.), and End-X®, (Seikagaku America, Falmouth, Mass); however, in order to facilitate their economical use at commercial scale, they must typically be regenerated and cleaned-in-place for repeated use. See Adner et al., 1994. The cleaning and repeated-use procedures employed in federally-regulated industries such as pharmaceutical manufacturing are labor intensive and subject to time consuming validation studies required to document the potential for the generation of resin leachables and the anticipated resin useful life. See Seely et al., 1994.

Methods for the removal or separation of organic components from biological fluids, such as mammalian blood fluid, including whole blood, blood plasma, and blood serum have been described. See Belter et al., 1988, Harris, 1991, Kenney et al., 1992, Kent et al., 1996, Lydersen et al., 1994, and Walker, 1984.

SUMMARY OF-THE INVENTION

Provided are methods for the substantial removal of organic substances, such as endotoxin, from aqueous solutions. The methods permit the preparation of aqueous solutions substantially depleted of organic substances, such as endotoxin. The methods permit the formation of aqueous solutions that are, for example, suitable for medical use.

In one embodiment, a method is provided for substantially removing at least one bacterial, plant, algal or fungal component from an aqueous solution comprising the component, the method comprising: contacting the aqueous solution with a synthetic hydrated calcium silicate ("SHCS"); and substantially removing the component from the aqueous solution. The method may include contacting the aqueous solution with a synthetic hydrated calcium silicate (SHCS) to permit the formation of a complex of the component and the SHCS; and separating the complex of the component and the SHCS from the aqueous solution, thereby to substantially remove the component from the aqueous solution. The complex is separated, for example, by centrifugation or sedimentation. During the contacting step, the pH of the aqueous solution can be, for example, maintained at about pH 5.5 to pH 9.5, or about pH 5.5 to pH 7.5.

The bacterial, plant, algal or fungal component is, for example, a lipid, a lipopolysaccharide, glucan or a lipoprotein. The invention advantageously provides methods for removing endotoxin and other Limulus amebocyte lysate-reactive materials.

Aqueous solutions that can be treated, include, for example, water, chemically buffered aqueous solutions, pharmaceutical solutions, aqueous solutions comrising a nutritional supplement, culture media, and growth media. The aqueous solution can comprise, for example, pharmaceutical compendial water or non-compendial water.

The SHCS, for example, may be crystalline. In one embodiment, the method of removal comprises passing the aqueous solution through the SHCS supported on a septum, thereby to contact the aqueous solution with a SHCS to permit the formation of a complex of the organic substance and the SHCS, and thereby to separate the complex of the organic substance and the SHCS from the aqueous solution. In another embodiment, the method comprises passing the aqueous solution through a holding device comprising the SHCS, thereby to contact the aqueous solution with the SHCS to permit the formation of a complex of the organic substance and the SHCS, and thereby to separate the complex of the organic substance and the SHCS from the aqueous solution. The holding device is, for example, a cartridge, filter pad, sheet, or membrane.

MODES FOR CARRYING OUT THE INVENTION

Figure 1:
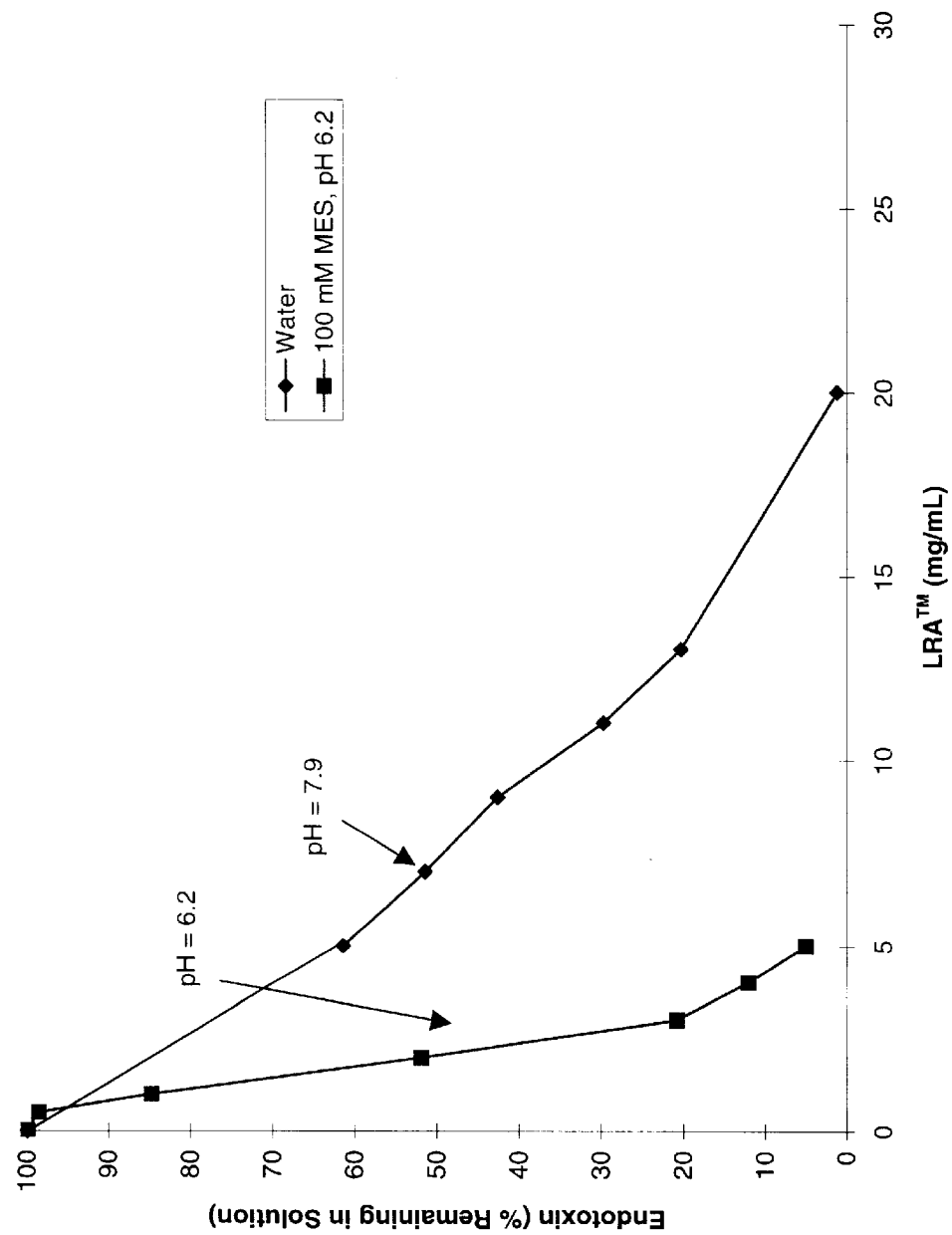
FIG. 1 is a graph showing the effect of pH on endotoxin removal with a SHCS (LRA™)

Provided are methods for the substantial removal of components from aqueous solutions. Components that can be removed from aqueous solutions include organic substances, such as endotoxin. In one embodiment of the method, the aqueous solution is contacted with SHCS. Organic substances that can be substantially removed from aqueous solutions include lipids, lipoproteins, and lipopolysaccharides, such as endotoxin. The method may further include modulation of solution pH.

The method advantageously permits the substantial removal of components from bacteria, plants, algae and fungi, when such components are undesirably present in aqueous solutions. Examples of such components include bacterial endotoxins.

Organic Substances

As used herein the term "organic substance" refers to materials that contain carbon and hydrogen. Organic substances that can be removed from aqueous solutions include lipids, proteins, lipopolysaccharides, lipopolysaccharide-protein complexes, glucans, phospholipids, nucleic acids, lipoproteins, polymers, or biologically-active molecules.

Exemplary lipopolysaccharides include endotoxin. Endotoxin includes all of the individual varieties, according to the species or strain of bacteria that produces them, which are derived from the various genetic variations of O antigen, core oligosaccharide, and lipid A which comprise the endotoxin structure. See, e.g., Wheat, R. W., 1984, "Composition, Structure, and Biosynthesis of the Bacterial Cell Envelope and Energy Storage Polymers," *Zinsser Microbiology: Eighteenth Edition*, pp. 93–112, W. K. Joklik, H. P. Willett, and D. B. Amos, Eds, Appleton-Century-Crofts, Norwalk, Connecticut. Endotoxin is a component of many of the gram-negative bacteria. Examples of specific bacteria include Escherichia, Salmonella, Proteus, Citrobacter, Shigella, and Pseudomonas.

Exemplary glucans include the Limulus Amebocyte Lysate (LAL) reactive materials. LAL reactive materials include the β-D-glucans that are microbiological- or cellulose-derived and which cross-react with analytical methods for endotoxin detection. A common source of β-D-glucan is from materials manufactured with wood pulp. See Cooper et al., 1997.

As used herein, "substantial removal" of a component, such as an organic substance, from an aqueous solution, refers to removal of at least a portion of the component from the aqueous solution. In one embodiment, at least about 50% of the component is removed. In another embodiment, at least 60%, 70%, 80% or 90% of the component is removed. In a further embodiment, at least 92%, 95% or 98% of the component is removed from the aqueous solution.

As used herein, "substantial removal" of endotoxin from an aqueous solution, refers to removal of at least a portion of the endotoxin from the aqueous solution. In one embodiment, at least about 50% of the endotoxin is removed. In another embodiment, at least 60%, 70%, 80% or 90% of the endotoxin is removed. In a further embodiment, at least 92%, 95% or 98% of the endotoxin is removed from the aqueous solution.

Aqueous Solutions

Components can be substantially removed from a variety of aqueous solutions. As used herein the term "aqueous solution" includes at least water and the component to be substantially removed. The component to be substantially removed may be, for example, dissolved or suspended in the solution.

Exemplary aqueous solutions are pharmaceutical compendial (United States Pharmacopoeia (USP) water for injection and USP purified water) and non-compendial waters. The USP defines the method of production and control monitoring procedures required for compendial water. These procedures include, for example, direct testing and continuous monitoring for the presence of endotoxin. See United States Pharmacopoeia & National Formulary, 2000. Exemplary pharmaceutical compendial waters are those used for the manufacture of pharmaceutical products or as the diluent for reconstitution of a dry powder pharmaceutical product prior to administration. Water for injection purposes, an example of compendial water, has an endotoxin concentration as defined by the USP of not more than 0.25 endotoxin units per ml.

End-use for non-compendial water may often require similar quality (for example low bioburden, i.e., low endotoxin concentration) to that of compendial water. Examples of non-compendial waters are those used for the manufacture or reconstitution of diagnostic reagents, and may also include the high purity water products used for storing chromatography media or filtration media for the manufacture of pharmaceutical, medical device or other related products.

Other exemplary aqueous solutions include aqueous solutions comprising chemical buffers and process solutions that are prepared for the manufacture or final storage of pharmaceuticals, medical devices or other related products. Examples of chemical buffers include: 2-[N-Morpholino] ethanesulfonic acid], pKa 6.1; N-[2-Hydroxyethyl] piperazine-N'-[2-ethanesulfonic acid], pKa 7.5; Tris [hydroxymethyl]aminomethane, pKa 8.1; 2-[N-Cyclohexylamino]ethane-sulfonic acid, pKa 9.3; and 3-Cyclohexylamino]-1-propane-sulfonic acid, pKa 10.4; which are available from Sigma, St. Louis, Mo. Examples of process solutions include: sodium citrate solution, USP; and ACD [Adenine Citrate Dextrose] Solution, USP; which are available from Baxter Healthcare Corporation, Deerfield, Ill.

Other exemplary aqueous solutions include solutions used for medical supportive therapy, and injectable or intravenous pharmaceutical or nutritional solutions. Examples of medical supportive solutions include: aqueous sodium chloride solutions, such as 0.9% sodium chloride; electrolyte solutions (e.g., solutions of chloride, sodium, potassium, or combinations thereof); dextrose solutions; and irrigation solutions (such as sterile water), for example, for cytoscopy or general and arthroscopic surgical procedures; which are available from B. Braun Medical Inc., Bethlehem, Pa.

Other examples of aqueous solutions include pharmaceutical or nutritional solutions, such as amino acid solutions (e.g., TrophAmine®); fat emulsions (e.g., Liposyn®); and peritoneal dialysis solutions (e.g., Dialyte®); which are available from B. Braun Medical Inc., Bethlehem, Pa.

In another embodiment, the aqueous solutions may comprise a culture or growth media or other supplements prepared in an aqueous solution to support the growth, propagation or storage of mammalian, microbial, insect, or plant tissue cell culture systems. Growth media components include synthetic media components. Growth media components include amino acids, inorganic salts, vitamins, sugars, buffers, auxins, cytokinins, pH indicators, nucleic acids, antibiotics, fungicide, enzymes, growth factors, cytokines, lymphokines, and cryopreservatives. Examples of growth media include: Dulbecco's Modified Eagle Medium (mammalian); Thioglycollate Medium (microbial); Grace's Insect Cell Culture Medium (insect); and Murashige's Minimial Organics Medium (plant); which are available from Life Technologies, Grand Island, N.Y.

Methods of Substantial Removal

In one embodiment, an aqueous solution is contacted with a synthetic hydrated calcium silicate (SHCS) to permit the substantial removal of a component, such as an organic substance, such as endotoxin. The term "contacted" is used herein to refer to the step of bringing the aqueous solution to be treated into contact with the SHCS. In some embodiments, the aqueous solution to be treated may be contacted with the SHCS by mixing the aqueous solution and the SHCS. The term "mixing" is used herein to include conventional methods for mixing, such as, for example, blending, stirring, shaking, and the like, as may be carried out with the aid of any mechanical means, including, for example, stirrers, paddles, propellers, blades, shakers, rotators, rollers, pumps, and the like. In some embodiments wherein the aqueous solution to be treated is mixed with the SHCS, it is preferable to maintain the SHCS as a suspension in the aqueous solution during the contacting step.

In some embodiments, the aqueous solution to be treated may be contacted with the SHCS by single or repeated passing of the aqueous solution through the SHCS supported on a septum. In some embodiments, the aqueous solution to be treated may be contacted with the SHCS by single or repeated passing of the aqueous solution through a filter pad, sheet, or membrane, comprised or incorporated with the SHCS. In some embodiments, the aqueous solution to be treated may be contacted with the SHCS by single or repeated passing of the aqueous solution through a cartridge or other holding device containing the SHCS, a filter pad, sheet, or membrane, comprised or incorporated with the SHCS, or a combination thereof.

In some embodiments, contact of the aqueous solution with SHCS may be accomplished by incorporation of the SHCS as part of an in-line component for the production or generation of an aqueous solution (e.g., an in-line filtration component of a high purity water system). In some embodiments, contact of the aqueous solution with SHCS may be accomplished by incorporation of the SHCS as part of a point-of-use component for the production or generation of an aqueous solution (e.g., a terminal point-of-use filter for a high purity water system).

The concentration of SHCS in aqueous solution used in the contacting step may be chosen according to the amount of organic component, such as endotoxin, to be removed by binding to the SHCS, which is present in the aqueous solution. Increasing the concentration of SHCS in aqueous solution may increase the degree to which the component, such as endotoxin, is captured.

For the removal of endotoxin from aqueous solutions, in one embodiment, the concentration of SHCS in the aqueous solution is about 1 mg/mL to about 100 mg/mL. In a further embodiment, the concentration of SHCS in the aqueous solution is about 1 mg/mL to 50 mg/mL. In another embodiment, the concentration of SHCS in the aqueous solution is from about 1 mg/mL to 20 mg/mL.

The pH at which the aqueous solution is maintained during contact with the SHCS may be selected according to the amount of component, such as endotoxin, present in the aqueous solution, as well as the physical and chemical properties of the aqueous solution. In one embodiment, for example, for the substantial removal of endotoxin, the aqueous solution to be treated with the SHCS is maintained at a pH of from about 5.5 to 9.5. In another embodiment, the aqueous solution to be treated with the SHCS is maintained at a pH of from about 5.5 to 7.5.

The length of time that the aqueous solution to be treated is contacted with the SHCS may be selected according to the method with which the contacting step is performed. Those methods where the SHCS is maintained as a suspension in the aqueous solution during the contact step may require less time for removal of organic substances, such as endotoxin, than required for those methods where the SHCS is supported on a septum or incorporated into a cartridge or other holding device containing the SHCS, a filter pad, sheet, or membrane, comprised or incorporated with the SHCS, or a combination thereof. In one embodiment, for example for the substantial removal of endotoxin, the aqueous solution to be treated is contacted with the SHCS for a time of more than about 30 seconds (usually in the range of from about 30 seconds to about 24 hours); e.g., about 1 minute to about 6 hours; or about 10 minutes to 1 hour.

The temperature at which the aqueous solution to be treated is contacted with the SHCS may be chosen according to the physical and chemical properties of the aqueous solution. In a preferred embodiment, for example, for the substantial removal of endotoxin, the aqueous solution to be treated is contacted with the SHCS at a temperature of about $-10°$ C. to about $40°$ C. In another embodiment, the aqueous solution to be treated is contacted with the SHCS at ambient temperature (e.g., about $20°$ C.).

While not being limited to any theory, it is possible that the SHCS forms a complex with the organic substance in the aqueous solution, upon which the complex may be separated from the aqueous solution.

In one embodiment, a method is provided comprising contacting an aqueous solution containing an organic substance such as endotoxin with SHCS, thereby forming an SHCS-organic substance complex in the remaining aqueous solution. In embodiments where the aqueous solution is mixed with the SHCS, subsequent removal of the SHCS-organic substance complex from the SHCS-treated aqueous solution is implemented. The SHCS-organic substance complex may be separated from the treated aqueous solution using known methods, including, for example, filtration (e.g., gravity filtration, constant flow filtration, constant pressure filtration), sedimentation, centrifugation, and the like.

SHCS is preferably a fine powder prepared by hydrothermal reaction of silica, hydrated calcium oxide (i.e., calcium hydroxide), and water, and is crystalline. SHCS possesses a highly desirable intricate and porous microstructure. See Celite, 1991, Publication No. FF-572 10/91; and Celite, 1991, Publication No. FF-396 11/91.

In many preferred embodiments, SHCS comprises 45%–95% silicon by weight (reported as $SiO_2$), 5%–35% calcium by weight (reported as CaO), and 1%–20% $H_2O$ by weight. In some preferred embodiments, SHCS comprises 45%–55% silicon by weight (reported as $SiO_2$), 25%–35% calcium by weight (reported as CaO), and 1%–20% $H_2O$ by weight. The balance, usually 1% to 10% by weight, may contain, for example aluminum (i.e., Al, typically reported as alumina, $Al_2O_3$), alkali metals (e.g., sodium, Na, and potassium, K, typically reported as the oxides, $Na_2O$ and $K_2O$, respectively), iron (i.e., Fe, typically reported as $Fe_2O_3$), and magnesium (i.e., Mg, typically reported as the oxide, magnesia, MgO).

In many preferred embodiments, the SHCS powder has a particle size of from about 0.01 micron to about 0.10 micron as determined, for example, by x-ray measurements and/or electron microscopy. Of these small particles, aggregates as large as about 100 microns may also be present. In preferred embodiments, the retention on a 325 mesh sieve is less than about 10% by weight, more preferable less than about 8% by weight. In many preferred embodiments, the SHCS powder has a surface area of more than about 75 $m^2/g$, usually from about 75 $m^2/g$ to 200 $m^2/g$.

An exemplary SHCS is LRA™ (Advanced Minerals Incorporated, Lompoc, Calif.). The pH of a 10% slurry of LRA™ in water is about 8.5.

In one embodiment, the SHCS is provided in a water purification system, such as systems used to produce water of high purity, for example, for use in the manufacture of a pharmaceutical or medical device product. In some embodiments, contact of the aqueous solution with SHCS may be accomplished by incorporation of the SHCS as part of an in-line component for the production or generation of an aqueous solution (e.g., an in-line filtration component of a high purity water system). In some embodiments, contact of the aqueous solution with SHCS may be accomplished by incorporation of the SHCS as part of a point-of-use component for the production or generation of an aqueous solution (e.g., a terminal point-of-use filter for a high purity water system).

The invention is illustrated in the following non-limiting examples. All publications, patents and patent applications referred to herein are incorporated herein by reference in their entirety.

EXAMPLES

Example 1

The substantial removal of endotoxin from endotoxin-spiked water and from an endotoxin-spiked buffer solution was demonstrated at alkaline pH versus neutral pH.

LRA™ (Advanced Minerals Incorporated, Lompoc, Calif.) was added at increasing concentration (i.e., 0 to 20 mg/mL) to sample tubes spiked with endotoxin (Endotoxin Standard, Sigma, St. Louis, Mo.) in 1.0 mL final volume of either highly purified water (LAL Reagent Water, BioWhittaker, Walkersville, Md.), pH 5.7 or highly purified water buffered with 100 mM MES (i.e., 2-[N-Morpholino] ethane-sulfonic acid, Sigma, St. Louis, Mo.), pH 6.2. The endotoxin plus LRA™ suspensions were mixed on a rotating mixer for one hour at room temperature. Subsequently, the suspension was centrifuged (5000 rpm for 10 min) and the supernatant solutions removed by decantation.

The solution pH values and endotoxin concentrations were determined.

Table 2 below shows the solution pH data when either water or MES buffer was utilized for endotoxin binding evaluation in the presence of increasing concentration of LRA™. The pH of LRA™ treated endotoxin solution in water increased from 5.7 without LRA™ to 7.9 at 7 mg/mL LRA™. Further increases to pH 8.1 occurred at 20 mg/mL LRA™. In contrast, the pH of LRA™ treated endotoxin solution in 100 mM MES buffer increased from 6.2 without LRA™ to only 6.7 at 20 mg/mL LRA™.

TABLE 2

Effect of MES Buffer on pH of LRA ™ Treated Solution

| LRA (mg/mL) | Water | MES Buffer |
| --- | --- | --- |
| 0 | pH 5.7 | pH 6.2 |
| 0.5 | Not Tested | pH 6.2 |
| 1 | Not Tested | pH 6.2 |
| 2 | Not Tested | pH 6.3 |
| 3 | Not Tested | pH 6.3 |
| 4 | Not Tested | pH 6.3 |
| 5 | pH 7.3 | pH 6.4 |
| 7 | pH 7.9 | pH 6.5 |
| 9 | pH 7.9 | pH 6.6 |
| 11 | pH 8.1 | pH 6.7 |
| 13 | pH 8.1 | pH 6.7 |
| 20 | pH 8.1 | pH 6.7 |

Endotoxin content of the supernatant solutions was determined by a kinetic colorimetic method using commercially available reagents and standards (BioWhittaker, Walkersvillle, Md. or Charles River, Charleston, S.C.). The test chemistry employs an enzyme system derived as a lysate from the blood (amebocytes) of the horse-shoe crab, Limulus polyphemus. The Limulus amebocyte lysate (LAL) test is the assay of choice for bacterial endotoxin. Bacterial endotoxin or other LAL-reactive materials (e.g, certaom glucans), initiate activation of an enzyme in the lysate that has specificty for a particular amino acid sequence. When a synthetic peptide with the specific amino acid sequence coupled to a chromophore is co-incubated with endotoxin-contaning solution and the lysate, the activated enzyme cleaves the peptide and releases the chromophore. The released chromophore produces a yellow color that can be measured spectrophotomrically. The onset of color development is inversely related to the amount of endotoxin or LAL-reactive material in a test sample; therefore, levels in unknown samples can be determined by comparing to assay standards of known concentration (BioWhittaker Product Insert for Kinetic-QCL Test Kit, 1996).

Reference standard endotoxin (RSE) is the USP Endotoxin Reference Standard, which has a defined potency expressed in Endotoxin Units (EU) per vial. Endotoxin assay standards are prepared from dilutions of a secondary "Control Standard Endotoxin" which is standardized against the RSE. The number of EU detected per unit volume directly correlate with the concentration of endotoxin present in the sample.

FIG. 1 is a graph showing the endotoxin removal curves from LRA™ treated endotoxin solutions in water or MES buffer. A shift to the left of the curve with water containing MES buffer is depicted relative to that without buffer, indicating that more endotoxin was removed from solution by direct binding to LRA™ at the lower pH condition.

Figure 2:
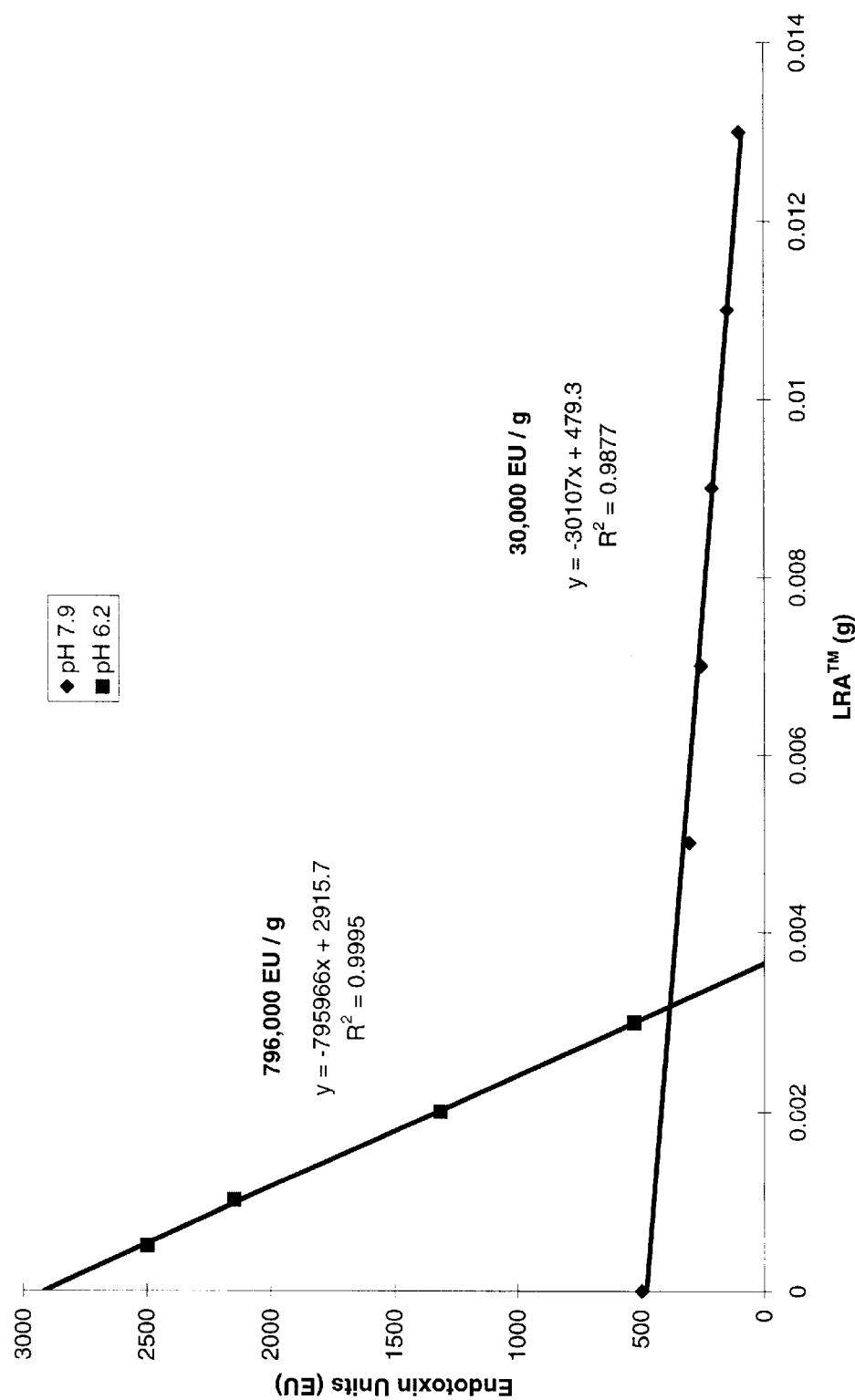
FIG. 2 is a graph showing endotoxin binding to a SHCS (LRA™) at pH 7.9 and pH 6.2.

FIG. 2 plots the absolute values, LRA™ (g) versus Endotoxin Units (EU), of the linear portions depicted in the FIG. 1 curves. Linear regression calculations were utilized to determine the binding capacities as EU bound per gram of LRA™. The data demonstrate binding capacities of 30,000 EU/g LRA™ in water at midpoint pH 7.9 and 796,000 EU/g LRA™ in buffered solution at midpoint pH 6.2.

Example 2

The impact of pH on binding to LRA, as demonstrated in Example 1, is further demonstrated using highly purified, well-characterized, commercially available components as a source of model lipid. This system was used as a model for demonstrating that adjustment of pH enhances LRA™ removal of components from aqueous solutions, and demonstrates the usefulness of this method.

The binding capacity to LRA™ of highly purified preparations representing members of these various molecular groups was evaluated at the pH that LRA™ tends to equilibrate when prepared as a suspension in water (final pH roughly 8.0 to 9.0) and at near neutral pH when prepared as a suspension in a biological buffer (final pH roughly 6.5 to 7.0). Bovine cholesterol (Cholesterol Calibrator Solution, Sigma, St. Louis, Mo.), chicken egg triglyceride (Triglyceride Concentrate, Golden West Biologicals, Inc., Temecula, Calif.), chicken egg phospholipid (Phosphatidylcholine, Sigma, St. Louis, Mo.), and human plasma apolipoprotein (Apolipoprotein Al, Athens Research and Technology, Inc., Athens, Ga.) were evaluated.

LRA™ (Advanced Minerals Incorporated, Lompoc Calif.) was added at various increasing concentrations to sample tubes prepared with highly purified lipid or apolipoprotein preparations diluted into either water, pH 5.0 to 5.5 or buffer comprised of 100 mM MES (2-[N-Morpholino] ethane-sulfonic acid, Sigma, St. Louis, Mo.), pH 6.1 to 6.3. The LRA™ suspensions were mixed on a rotating mixer for one hour at room temperature. Subsequently, the suspensions were centrifuged (5000 rpm for 10 min) and the supernatant solutions removed by decantation.

Solution pH values were recorded. Specific concentrations of lipid or apolipoprotein remaining in solution were determined by use of one of the following commercially available test kits procedures: Total Cholesterol (Sigma, St. Louis, Mo.), Triglycerides GPO-Trinder (Sigma, St. Louis, Mo.), Phospholipids B (Wako Chemical GmbH, Neuss, Germany), and Apolipoprotein A-l Array 360 (Beckman, Brea, Calif.). The binding capacities (mg bound per g LRA™), for each lipid or apolipoprotein evaluated, were determined from linear regression curves at the point of half saturation of LRA™ with binding component. A summary of the analytical results is shown below in Table 1.

TABLE 1

Effect of pH on Binding Capacity of LRA ™ for Lipids and Apolipoprotein

| Highly Purified Component | Diluent | pH* | mg/g LRA | Capacity Increase |
|---|---|---|---|---|
| Cholesterol (Bovine Plasma) | Water | 9.1 | 7 | 5.7 X |
| | Buffer | 7.2 | 40 | |
| Triglyceride (Chicken Eggs) | Water | 8.6 | 82 | 1.4 X |
| | Buffer | 6.7 | 115 | |
| Phosphatidylcholine (Chicken Eggs) | Water | 7.9 | 265 | 1.2 X |
| | Buffer | 6.6 | 314 | |
| Apolipoprotein A1 (Human Plasma) | Water | 7.9 | 80 | 2.6 X |
| | Buffer | 6.8 | 213 | |

*pH at half-saturation of LRA ™ with binding component

As shown in Table 1, the pH values for solutions of the various binding components prepared in water varied on the alkaline side of the pH scale from pH 7.9 to pH 9.1. In contrast, the pH values for solutions of the various binding components prepared in MES buffer varied on the near neutral side of the pH scale from pH 6.6 to 7.2. The binding capacity data demonstrate higher capacity binding (mg/g LRA™), for each lipid or apolipoprotein component evaluated, when the solution pH had been controlled by use of the buffer at near neutrality versus without the buffer where LRA™ prefers to equilibrate at alkaline pH. Binding capacity increases, at the lower pH condition, varied from 1.2-fold for phosphatidylcholine to 5.7-fold for cholesterol.

References

Morrison, D. C., et al., 1994, "Current Status of Bacterial Endotoxins," *ASM News* Vol. 60, pp. 479–484.

Bone R., 1991, "The Pathogenesis of Sepsis," *Ann Intern Med* Vol. 115, pp. 457–469.

Schaule, G., et al., 1997, "Pathogenic Microorganisms in Water System Biofilms," *Ultrapure Water* Vol. 14, pp. 21–27.

Cooper, J., et al., 1998, "Monitoring Water Systems for Endotoxin," *LAL Times* Vol. 5, pp. 1–5.

Sharma, S. K., 1986, "Review: Endotoxin Detection and Elimination in Biotechnology," *Biotechnol Appl Biochem* Vol. 8, pp. 5–22.

Sweadner, K. J., et al., 1977, "Filtration Removal of Endotoxin (Pyrogens) in Solution in Different States of Aggregation," *Appl Environ Microbial* Vol 34, pp. 382–385.

Adner, N., et al., 1994, "Biotechnology Product Validation, Part 3: Chromatography Cleaning Validation," *BioPharm* Vol 7, No. 3, pp. 44–48.

Seely, R. J., et al., 1994, "Validation of Chromatography Resin Useful Life," *BioPharm* Vol7, No. 7, pp. 41–48.

Kent, R. S., et al, 1996, U.S. patent application PCT/US96/20034.

Cooper, J. F., et al., 1997, "The Impact of Non-endotoxin LAL-Reactive Materials on Limulus Amebocyte Lysate Analyses," *PDA J Pharmaceut Sci Technol* Vol 51, pp. 2–6.

United States Pharmacopeia 24 & National Formulary 18, 2000, pp. 1752–1754, 2154–2165.

Celite, 1991, "Micro-Cel® For the Rubber Industry," publication number FF-572 10/91, Celite Corporation, Lompoc, Calif., USA.

Celite, 1991, "Functional Fillers for Applications," publication number FF-396 11/91, Celite Corporation, Lompoc, Calif., USA.

Belter, P. A., et al., 1988, *Bioseparations: Downstream Processing for Biotechnology*, John Wiley & Sons, New York.

Harris, J. R., 1991, editors, *Blood Separation and Plasma Fractionation*, Wiley-Liss, New York.

Kenney, A., et al., 1992, editors *Practical Protein Chromatography*, Methods in Molecular Biology Volume 11, Humana Press, Totowa, N.J.

Lydersen, K. L., et al., 1994, editors, *Bioprocess Engineering: Systems, Equipment and Facilities*, John Wiley & Sons, New York.

Walker, J. M., 1984, editors, *Proteins*, in Molecular Biology Volume 1, Humana Press, Clifton, N.J.

What is claimed is:

1. A method for substantially removing at least one bacterial, plant, algal or fungal component from an aqueous solution comprising the component, the method comprising:

contacting the aqueous solution with a synthetic hydrated calcium silicate ("SHCS"); and substantially removing the component from the aqueous solution.

2. The method of claim 1, wherein:

said contacting of the aqueous solution with a synthetic hydrated calcium silicate (SHCS) permits the formation of a complex of the component and the SHCS; and the complex of the component and the SHCS is separated from the aqueous solution, thereby to substantially remove the component from the aqueous solution.

3. The method of claim 2, wherein the method comprises passing the aqueous solution through the SHCS supported on a septum, thereby to contact the aqueous solution with a SHCS to permit the formation of a complex of the organic substance and the SHCS, and thereby to separate the complex of the organic substance and the SHCS from the aqueous solution.

4. The method of claim 2, wherein the method comprises passing the aqueous solution through a holding device comprising the SHCS, thereby to contact the aqueous solution with the SHCS to permit the formation of a complex of the organic substance and the SHCS, and thereby to separate the complex of the organic substance and the SHCS from the aqueous solution.

5. The method of claim 4, wherein the holding device is a cartridge, filter pad, sheet, or membrane.

6. The method of claim 2, wherein said complex is separated by centrifugation.

7. The method of claim 2, wherein said complex is separated by sedimentation.

8. The method of claim 1, wherein the component comprises a lipid.

9. The method of claim 1, wherein the component comprises a glucan.

10. The method of claim 1, wherein the aqueous solution comprises water, a chemical buffer, a pharmaceutical solution, a nutritional supplement, a culture medium, or a growth medium.

11. The method of claim 10, wherein the aqueous solution comprises pharmaceutical compendial water or non-compendial water.

12. The method of claim 10, wherein the aqueous solution comprises a chemical buffer.

13. The method of claim 10, wherein the aqueous solution comprises a pharmaceutical solution.

14. The method of claim 10, wherein the aqueous solution comprises a nutritional supplement.

15. The method of claim 10, wherein the aqueous solution comprises a culture medium or growth medium.

16. The method of claim 1, wherein during said contacting the pH of the aqueous solution is maintained at about pH 5.5 to pH 9.5.

17. The method of claim 16, wherein the pH of the aqueous solution is maintained at about pH 5.5 to pH 7.5.

18. The method of claim 1, wherein the SHCS is crystalline.

19. The method of claim 1, wherein the component is a bacterial component.

20. The method of claim 1, wherein the component is a plant component.

21. The method of claim 1, wherein the component comprises a lipid or lipopolysaccharide.

22. The method of claim 1, wherein the component is a bacterial endotoxin.

23. The method of claim 1, wherein the component is a Limulus amebocyte lysate-reactive material.

* * * * *